W. G. THOMASON.
Coffee-Pot.
No. 197,429.  Patented Nov. 20, 1877.
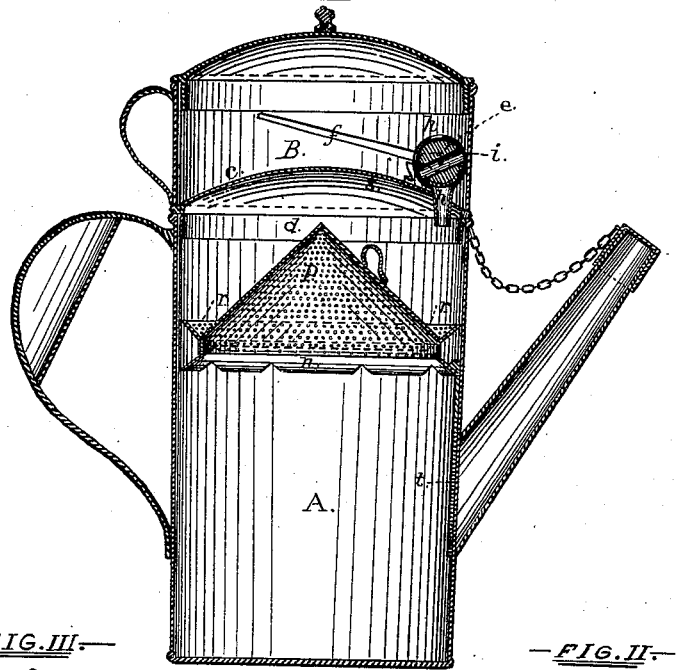
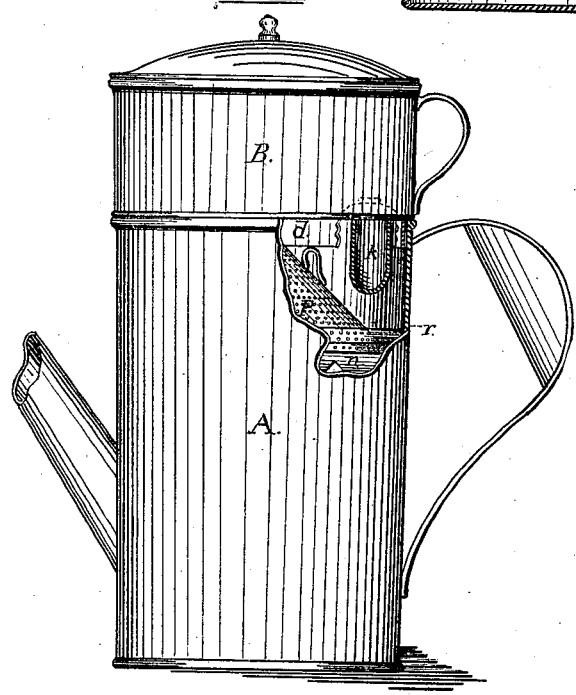
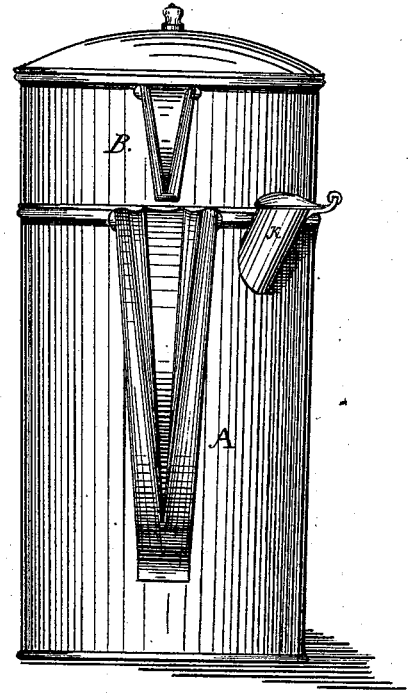
WITNESSES
Chs. E. Lewis
Jno. R. Shedden
INVENTOR
Wm. G. Thomason
By his Attorney
Chas. B. Mann

UNITED STATES PATENT OFFICE.

WILLIAM G. THOMASON, OF WOODBERRY, MARYLAND.

IMPROVEMENT IN COFFEE-POTS.

Specification forming part of Letters Patent No. 197,429, dated November 20, 1877; application filed October 8, 1877.

*To all whom it may concern:*

Be it known that I, WILLIAM G. THOMASON, of Woodberry, in the county of Baltimore and State of Maryland, have invented a new and useful Improvement in Coffee-Pots, which is fully set forth in the following specification and accompanying drawings, in which—

Figure 1 is a vertical section of my improved coffee-pot. Fig. 2 is a side view, showing valve; and Fig. 3, a side view of same with parts broken away.

My invention relates to that class of coffee-pots that have arranged on top a supplemental vessel containing cold water, and acting as a condenser; and consists in a condenser in which is arranged a valve of peculiar construction, operated by a lever, and to a valve applied to the body of the coffee-boiler, and to a coffee steeper or strainer of peculiar construction affixed in the upper part of boiler, and operating in connection with the concaved bottom of condenser.

Referring to the drawings, A represents the coffee-boiler; B, the condenser, consisting of a covered vessel, the bottom of which is convexed on the inner side, as shown at $c$, and is provided with a flange, $d$, which fits in the top of the boiler. This top is a little larger than the bottom, by which construction the flange $d$ of condenser fits the boiler closely, as will be readily understood.

$e$ is a valve in the bottom of the condenser, constructed of a short cylinder, with its ends closed, and having two holes, $i$, on opposite sides, and turning within an outer cylinder, also having two holes, $h$, one on top and the other on lower side, the latter opening through the bottom of the condenser. Attached to the inner cylinder is a lever, $f$, by raising which the holes $h$ of outer cylinder coincide with the holes $i$ of the inner, when water in the condenser would run through into the boiler.

A flap or hinged valve, $k$, fits closely over a small projecting lip, and covers an opening into the boiler. This valve is located near the upper part of the boiler, and on the right side of the handle, and serves as an escape for the steam in the event the attendant neglects to replenish the condenser with cold water, and also serves the further purpose of access to the boiler, whereby, if desired, additional ground coffee may be supplied without the removal of condenser or cover, and, consequently, without any escape or loss of aroma.

A perforated flange, $n$, is affixed around the inner sides of the boiler, and serves as a support for a perforated steeper or strainer, $p$, conical in form, and having an upturned flange or rim, $r$, at the base of cone, around which the ground coffee is placed without covering the cone at its highest part.

A removable strainer, $t$, is arranged at the base of the spout.

When the water in the pot is at the boiling-point, the rising steam steeps the coffee, and, passing through the perforated cone at its high and uncovered part, condenses on the concaved lower side $s$ of condenser, the liquid flowing to the flange $d$, and thence down the inner sides of pot, percolating the ground coffee around the rim $r$.

This manner of returning the condensed steam (liquid) by means of the concaved bottom $s$ has the effect to seal the joint or space between the flange $d$ and mouth of boiler, and effectually prevents the escape of any aroma.

By my improvements water may be supplied to the boiler through the condenser-valve, or ground coffee may be supplied through the flap-valve, without the escape of any steam or aroma while the coffee is boiling, thus saving all the strength and flavor, and affording a beverage of ample strength without requiring the use of so much coffee.

Having described my invention, I claim and desire to secure by Letters Patent—

1. The condenser B, having its bottom concaved from the lower side, and provided with the valve $e$, constructed as described, and operated by the lever $f$, whereby water from the condenser runs through into the boiler.

2. The perforated flange $n$, supporting the perforated conical steeper $p$, having the upturned rim $r$, as shown and described, and for the purpose specified.

WILLIAM G. THOMASON.

Witnesses:
CHAS. B. MANN,
CHS. E. LEWIS.